(12) United States Patent
Wan et al.

(10) Patent No.: US 10,882,696 B2
(45) Date of Patent: Jan. 5, 2021

(54) CONTINUOUS FLOW OPERATION OF A MERGE SYSTEM

(71) Applicant: Dematic Corp., Grand Rapids, MI (US)

(72) Inventors: Shanshan Wan, Austin, TX (US); Arturo Hinojosa, Austin, TX (US)

(73) Assignee: Dematic Corp., Grand Rapids, MI (US)

( * ) Notice: Subject to any disclaimer, the term of this patent is extended or adjusted under 35 U.S.C. 154(b) by 91 days.

(21) Appl. No.: 16/389,271

(22) Filed: Apr. 19, 2019

(65) Prior Publication Data

US 2019/0322454 A1 Oct. 24, 2019

Related U.S. Application Data

(60) Provisional application No. 62/659,873, filed on Apr. 19, 2018.

(51) Int. Cl.
*G06F 7/00* (2006.01)
*B65G 1/137* (2006.01)
*G05B 15/02* (2006.01)

(52) U.S. Cl.
CPC .......... *B65G 1/1376* (2013.01); *G05B 15/02* (2013.01)

(58) Field of Classification Search
CPC ..... B65G 1/1376; B65G 1/1378; G05B 15/02
USPC .......................... 700/213–216; 218/223, 228
See application file for complete search history.

(56) References Cited

U.S. PATENT DOCUMENTS 8,892,240 B1 11/2014 Vliet et al.
9,527,669 B1 12/2016 Hanssen et al.
2008/0128244 A1 6/2008 Affaticati et al.
2011/0203231 A1 8/2011 Hortig et al.
2014/0212257 A1 7/2014 Yamashita
2015/0134490 A1* 5/2015 Collin .................. G06Q 10/087
705/26.81

(Continued)

OTHER PUBLICATIONS

Dematic Corp. "Health and Safety Program." Published Jul. 2011.

(Continued)

*Primary Examiner* — Yolanda R Cumbess
(74) *Attorney, Agent, or Firm* — Gardner, Linn, Burkhart & Ondersma LLP

(57) ABSTRACT

A continuous flow material handling system and method for consolidating articles into article groups, includes a plurality of article sources and a plurality of article destinations. A plurality of article merges and at least one sorter are between the article sources and destinations, with each of the merges having a plurality of queue lanes and a discharge. The at least one sorter has an inbound lane and a plurality of outbound lanes. The merges combine articles from a plurality of queue lanes and discharge to a downstream merge or sorter inbound lane. The article queue lanes of an upstream merge receiving articles from the article sources and the sorter outbound lanes discharging to the article destinations. A control system receives data from a warehouse management system (WMS). The control system activates each group at a merge in a same sequence as the group is released to the material handling system. The control activates a new group at a merge when all of the articles of the group that is already activated at that merge have cleared that merge. Approaches for group activation including revolving bubble, sliding bubble, and sliding bubble with strict sequencing.

23 Claims, 8 Drawing Sheets

(56) References Cited

U.S. PATENT DOCUMENTS

2017/0297828 A1* 10/2017 Solana .................. B65G 47/53
2019/0160493 A1* 5/2019 Garrett .................. B07C 3/082

OTHER PUBLICATIONS

International Search Report and Written Opinion of the International Searching Authority from corresponding Patent Cooperation Treaty Application No. PCT/IB2019/053279, dated Oct. 30, 2019.

* cited by examiner

CONTINUOUS FLOW OPERATION OF A MERGE SYSTEM

CROSS-REFERENCE TO RELATED APPLICATIONS

The present application claims priority of U.S. provisional application Ser. No. 62/659,873, filed Apr. 19, 2018, which is hereby incorporated by reference herein in its entirety.

BACKGROUND OF THE INVENTION

The present invention is directed to a material handling system and method and in particular to the consolidation of articles into separate groups of articles. While the invention is useful to fulfill orders for order fulfillment in e-commerce it may be used to consolidate articles into groups for other purposes. The terms "order" and "group" may be used interchangeably.

Order fulfillment systems and methods are typically batch type systems. A batch of orders are sent to the system which processes the orders together. When the orders of the batch are completed a new batch is processed. Thus, the orders are processed in waves. Not only does the addition of a new order need to await the next batch to get processed but the processing can cause gridlock as the processing of some order portions may at least temporarily stymie the movement of other group portions through the merges.

SUMMARY OF THE INVENTION

The present invention is directed to a waveless article consolidation system. This is accomplished in a manner that groups flow through a series of merges with optimal throughput of articles delivered to an end sorter, or a sortation network (collectively referred to as "sorter"), in a manner that inhibits gridlock of the merges due to movement of one group of articles stymieing another group of articles. The term "article" is intended to include not only individual items but receptacles such as totes, trays, or other containers that may contain multiple items.

The present invention provides a continuous flow material handling system and method of consolidating articles from multiple sources through a network of merges to be consolidated as orders or groups of articles by an end sortation system. The containers are retrieved from multiple source areas. From the source areas, they are transported to merge queues. Each merge combines containers from their multiple merge queues into a single stream of containers that can travel to another downstream merge or to the end sorter. Merge queues can partially release the queued containers into the outbound stream.

A continuous flow material handling system and method for consolidate articles into article groups, according to an aspect of the invention, includes a plurality of article sources and a plurality of article destinations. A plurality of article merges and at least one sorter are between the article sources and destinations, with each of the merges having a plurality of queue lanes and a discharge. The at least one sorter, or sortation network, has an inbound lane and a plurality of outbound lanes. The merges combine articles from a plurality of queue lanes and discharge to a downstream merge or sorter inbound lane. The article queue lanes of an upstream merge receiving articles from the article sources and the sorter outbound lanes discharging to the article destinations. A control system receives data from a warehouse management system (WMS) or another "host" system. The control system typically activates each group at a merge in a same sequence as the group is released to the material handling system. Orders released to the control system can included priority attributes for the control system to also consider in addition to the release sequence. Alternatively the control system can assign the priority attributes to the groups. The control activates one or several new groups at a merge as active groups clear merges, approaches for group activation include revolving bubble, and sliding bubble. The revolving bubble algorithm activates a new group when a group clears the merge. The sliding bubble algorithm activates one or more new groups when the active group with a minimum release sequence number clears the merge. The control may release any containers from a queue that correspond to activated groups without releasing any containers from groups that are not activated at that merge.

A continuous flow material handling system and method for consolidate articles into article groups, according to an aspect of the invention, includes a plurality of article sources, a plurality of article destinations, a plurality of article merges and at least one sorter, each of the merges has a plurality of queue lanes and a discharge, the at least one sorter has an inbound lane and a plurality of outbound lanes, the merges combine articles from a plurality of queue lanes and discharge to a downstream merge or the at least one sorter inbound lane. The article queue lanes of an upstream merge receiving articles from the article sources and the sorter outbound lanes discharging to the article destination. A control system receives data from a warehouse management system (WMS) or another "host" system. The WMS or host system releases data defining groups of articles to the control system including a group ID, a group priority, an article ID for each article in the group, and an article source location of each article in the group. The control system assigns a group release sequencing numbers (RSN) for each group, the RSN assigned to each group being sequential based on group priority and the sequence in which that group is released from the WMS to the material handling system. The control system maintains for each merge a log of a maximum (MAX RSN) for that merge and the RSN for articles in the queues of that merge. The control system causes a merge to release articles from each queue until an article having an RSN greater than the MAX RSN for that merge is next to be released.

In a revolving bubble algorithm article merges may be arranged in merge layers, each layer defined by merges being a same number of merges from the sorter. A layer manager is provided for each layer of merges. The layer manager providing coordination among merges in a layer so that the MAX RSN is the same for all merges in a layer. A new group can be activated at a layer when all items of an active group move past that layer. The MAX RSN for a layer may be increased when all items of an active group move past that layer. A limit may be placed on the number of active groups at each merge layer, with active groups prohibited from exceeding the number of article destinations.

A sliding bubble algorithm does not require merges to be arranged in layers or a layer manager. A subsequent article group may be activated at a merge when all articles of an active group have gone through that merge, including activating the article group with the oldest RSN at that merge. A maximum RSN (MAX RSN) may be maintained at a merge so that a number of concurrent activated RSN at that system layer does not exceed the number of article destinations. A minimum RSN (MIN RSN) may be maintained for a merge that is the group with the oldest/lowest RSN of any non-completed article groups that have articles going through that merge and increasing the MAX RSN for that merge only when the group having the MIN RSN is completed at that merge layer. The MAX RSN may be equal to MIN RSN plus the number of destinations minus 1.

A continuous flow material handling system and method for consolidate articles into article groups at destinations, according to an aspect of the invention, has a plurality of article sources, a plurality of article destinations, a plurality of article merges, and a sorter. The article merges and said sorter are arranged with an upstream one of said merges defining the plurality of article sources and the sorter defining the plurality of article destinations. Each intermediate merge discharging to a downstream merge or to said sorter. Data defining groups of articles are released to the material handling system. The data identifying articles making up each group and the location of those articles in the material handling system, an article number for each article in the group and a group release sequencing numbers (RSN). The RSN assigned to each group is sequential based on group priority and the sequence in which that group is released to the material handling system. When a revolving bubble algorithm is used an article group is activated at an article merge when all articles of an active group have gone through that merge. When a sliding bubble algorithm is used, one or more groups are activated at an article merge when all of the articles with the article group with the oldest RSN at that article merge (MIN RSN) have cleared at that article merge. A maximum RSN (MAX RSN) is maintained at each article merge so that a number of concurrent activated RSN at that article merge does not exceed the number of destinations.

When the sliding bubble algorithm is used a minimum RSN (MIN RSN) may be maintained for that merge that is the group with the oldest/minimum RSN of any non-completed article groups that have articles going through the merge. The MAX RSN may be increased for that merge only when the group having the MIN RSN is competed. The MAX RSN may be equal to MIN RSN plus the number of destinations minus 1.

Articles for each group may be required to arrive at a destination with defined sequencing of the articles at the destination. A group or articles may be divided into subgroups of articles that need to arrive in the pre-defined sequence. A different RSN may be assigned to each subgroup of a group that needs to arrive in the pre-defined sequence. Each merge handling each subgroup as a group.

These and other objects, advantages and features of this invention will become apparent upon review of the following specification in conjunction with the drawings.

DETAILED DESCRIPTION OF THE PREFERRED EMBODIMENT

Figure 1:
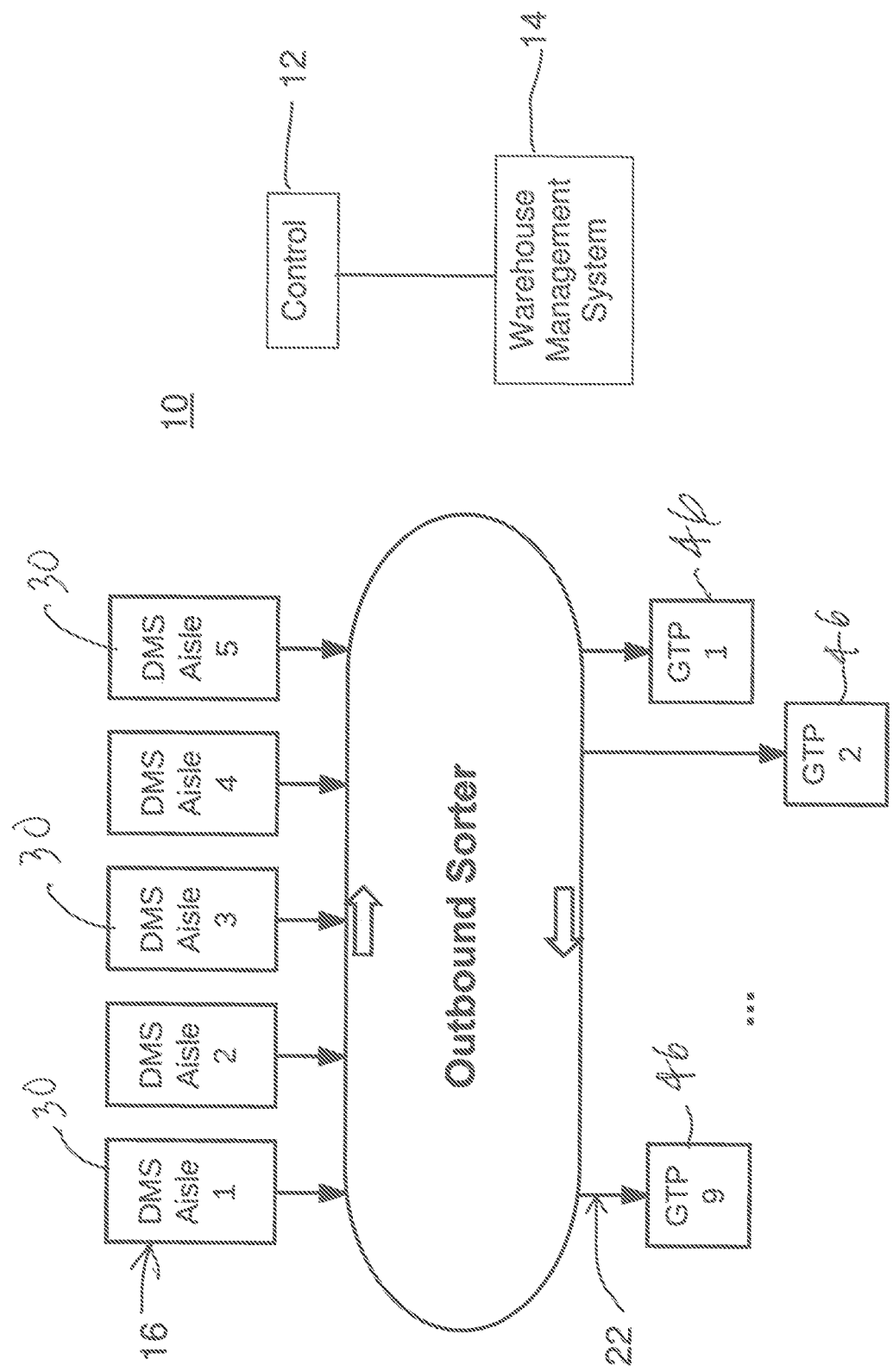
FIG. 1 is a schematic diagram of a merge system according to an embodiment of the invention.
Figure 2:
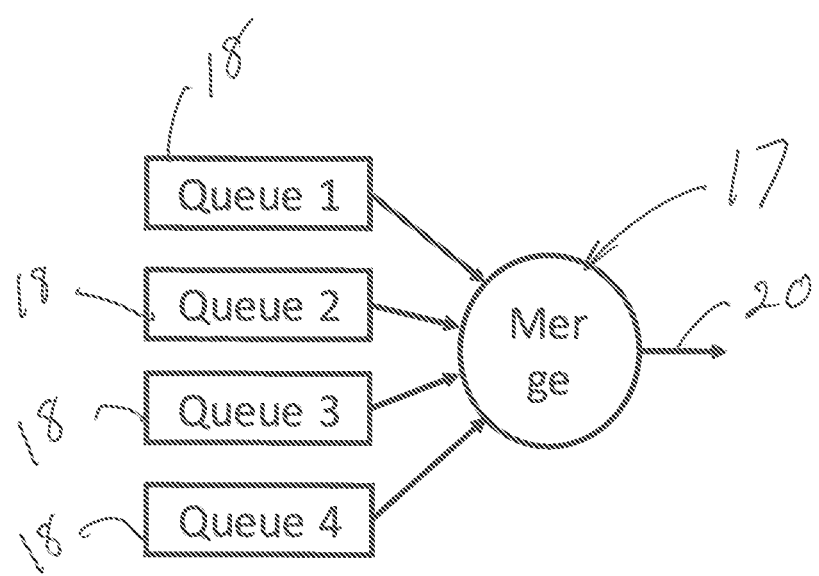
FIG. 2 is a functional diagram of a merge.

Referring now to the drawings and illustrative embodiments depicted therein, a material handling system 10 includes a control 12 for the system which receives data defining groups, or other groupings of articles, from a warehouse management system (WMS) 14. WMS 14, and or control 12, receives the data defining the groups from consumer or the like and may place some groups ahead of other groups and provides the groups sequentially at control 12. Each group is a set of data including a group ID, group priority, and article IDs of the article or articles making up the group or the ID of the containers in which the articles are located. The group data also includes source information where the article or container may be located within system 10 and a release sequence number (RSN). Control 12 continuously receives groups released from WMS 14 and assigns the RSN to that group based on group priority and the sequence in which the group is released from WMS 14. It should be understood that the RSN could be a sequentially increasing or decreasing number or some other type of code. For the purpose of this disclosure it shall be assumed that the RSN increases in value over time such that subsequently released groups have a higher RSN value than a previously released group.

System 10 includes a merge network 16 and a sorter 22. Merge network 16 includes multiple source locations 30 which, in the illustrative embodiment is an automated warehouse such as a multi-shuttle system marketed by Dematic Corp., automatic storage and retrieval systems (ASRS), mini-load systems, and the like. Alternatively, source locations 30 could be manual pick modules. Besides article source locations, merge network 16 includes a network of merges 17. Each merge 17 includes a plurality of input queues 18 additional source locations 30 defined by inbound queues 4, 7, 8, 9, 10, and 11, and a single output lane 20. These merges for example combine outputs from 2 multi-shuttle lifts, outbound conveyor from other merges, outputs from ASRS extractors, and the like. Each merge combines receptacles from their multiple merge queues into a single stream of receptacles that can go to another downstream merge or to the end sorter. Merge queues can partially release the queued containers into the outbound stream.

Figure 3:
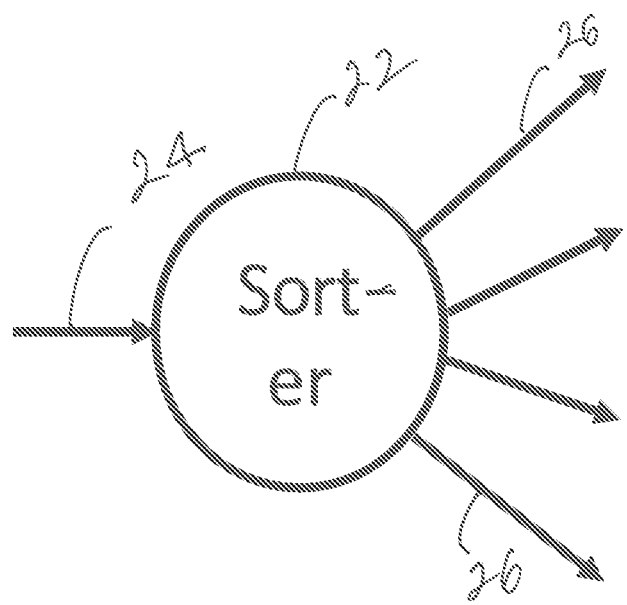
FIG. 3 is a functional diagram of a sorter.
Figure 4:
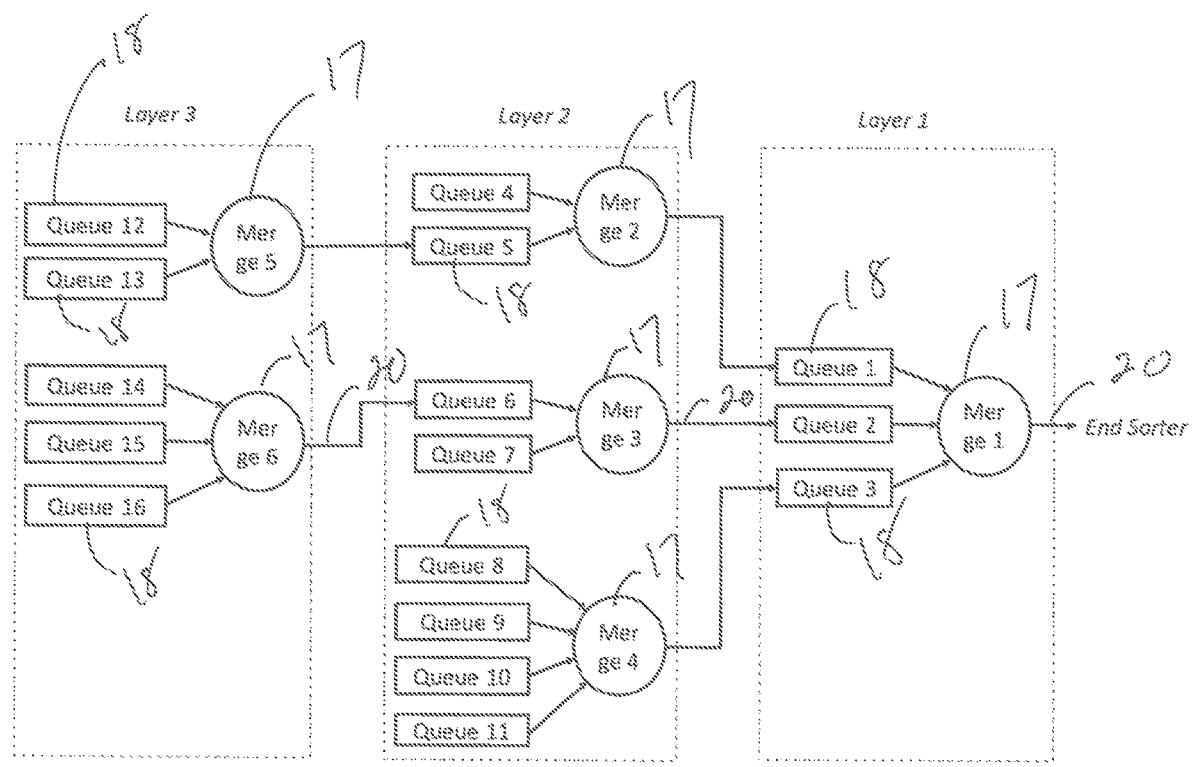
FIG. 4 is a schematic diagram of a multi-layer merge network.

Merges 17 are grouped by layers as best seen in FIG. 4. Each layer is defined as the set of merges at the same distance from the sorter 22. In the illustration in FIG. 4, the article queue lanes for the merges in layer 3 are the most upstream ones and receive articles from said article sources 30. Merges 17 combine articles from the article queue lanes 18 and additional source locations 30 and discharge articles with outbound lane 20 to a downstream merge, such as layer 4, layer 3, layer 2 or layer 1, or to inbound lane 24 of sorter 22. As best seen in FIG. 3, sorter 22 includes one inbound lane 24 and multiple outbound lanes 26. While the illustrated system is shown with one sorter assembly, it should be understood that multiple assemblies of sorter layers may be used as long as they fit this definition.

An embodiment of a material handling system 10 is shown in FIGS. 4 and. 5. However, variations may apply for particular applications. Material handling system 10 includes a set of aisles 34 for an automated three dimensional warehouse of the type disclosed in commonly assigned U.S. Pat. No. 9,266,675, the disclosure of which is hereby incorporated herein by reference. Each aisle includes a plurality of shuttles 36, typically one per rack level for storing to and retrieving articles from rack locations on one or both sides of the aisle. Each aisle also includes a lift 32 which retrieves articles from shuttles 36. In that manner, each aisle 34 performs the function of a merge since the shuttles 36 perform the function of a queue and the retrieved receptacles are combined with the corresponding lift 32, which performs the function of a merge. Each lift 32 supplies a staging conveyor 40 which, in turn feeds a collector conveyor 42. In this fashion, staging conveyors 40 and collector conveyor 42 performs the function of a merge since the articles from staging conveyors 40 are combined by collector conveyor 42. Collector conveyor 42 feeds a sorting conveyor 44 which, in turn feeds 9 Goods-To-Person Pick Stations (GTP) 46 of the type disclosed in commonly assigned U.S. Pat. No. 8,713,899, entitled Goods-To-Person Picking Station and Picking Method, the disclosure of which is hereby incorporated herein by reference. Each GTP 46 facilitates manual or robotic picking of individual items from inventory receptacles to group receptacles. Sorter system 48 is thus made up of sorting conveyor 44 and GTP's 46 and has a total of 9×6 or 54 sort destinations 50.

Figure 5:
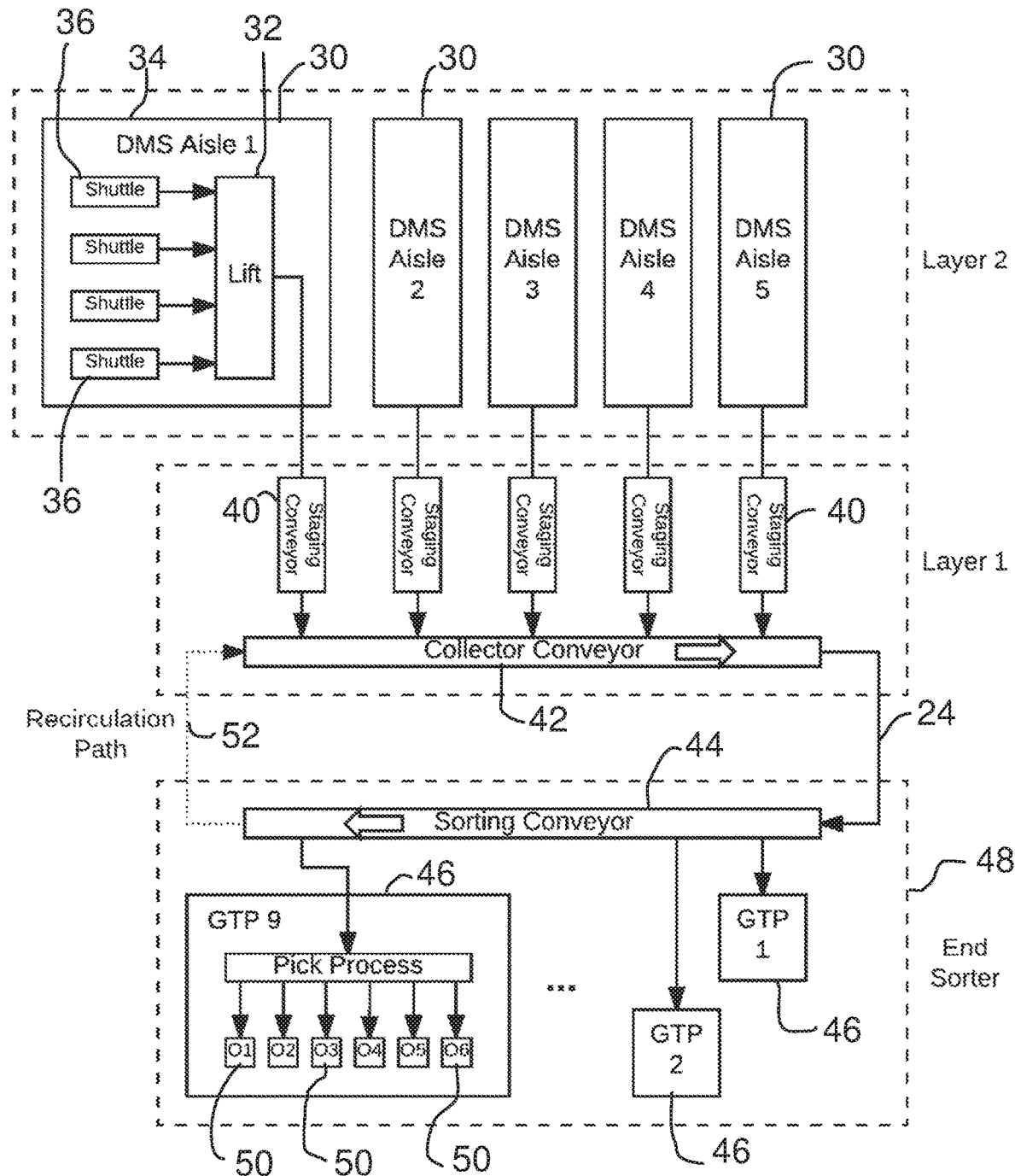
FIG. 5 is a block diagram of the embodiment shown in FIG. 1.

Thus, the material handling system illustrated in detail in FIG. 5 includes 5 multishuttle aisles 34 and shuttles 36 which act as queues feeding the merge node of a single outbound lift 32 in Layer 2. The 5 staging conveyors 40 act as queues feeding a collector conveyor 42 which act the merge in Layer 1. Collecting conveyor 42 has a single output that acts as an inbound lane 24 for End Sorter 48. A recirculation path 52 may be provided from the end of sorting conveyor 44 back to collection conveyor 42. The recirculation path is not a logical requirement for material handling system 10 but, rather, is a failsafe in a material handling facility to handle exceptions in the material handling operation. Also, recirculation path 52 may be for allowing totes not sent to one of GTP 46 to re-enter system 10 at a later point in time. The above is an exemplary system. What is required is a source of articles to be organized in to groups or order, a merge network and a sorter system to sort the articles into group destinations.

Control 12 controls flow of articles through material handling system 10. For the purpose of illustrations, each article is presumed to be handled by totes or other receptacles which can handle multiple articles. However, each article is presumed to move through system 10 individually for the purpose of combining one item of the tote with a group at one destination 50. As previously mentioned, WMS 14 receives data defining the groups such as orders from consumers or the like and may place some groups ahead of other groups and provides the groups sequentially to control 12. Each group is a set of data including a group ID and article IDs of the article or articles making up the group or the ID of the containers in which the articles are located. Each merge has a logical buffer defined in control 12 that maintains group data for each merge of the totes that will be transported through the merge. Such information includes Container ID and RSN. The group data also includes source information where the article or container may be located within automated warehouse 30 and a Group ID. As Control 12 receives groups released from WMS 14 and assigns the RSN to that group in the same sequence in which the group is released from WMS 14.

Each merge will operate as follows. Totes are queued in the merge queues, such as shuttles 36 or staging conveyors 40. Each tote has an associated RSN. At any time each merge has a MAX RSN that defines which containers can merge, which are known as merge active containers. Only containers with RSN equal to or smaller than the MAX RSN can merge. The merges may have a configurable sequence to release its queues such as disclosed in commonly assigned U.S. Pat. No. 7,909,155, entitled Conveyor System, the disclosure of which is hereby incorporated herein by reference. The end of the largest set that can be released is the last tote in the queue before the first tote with an RSN larger than MAX RSN for that merge.

There are various schemes for releasing totes. The merge release algorithm is the set of policies that controls the value of the MAX RSN for the merges. The end sorter destination for all groups is not pre-defined. Any group can be consolidated at any destination. One group has to be consolidated at one destination. There are two algorithms for which there is no sequencing requirements for the arrival of the group containers to its destination. Group containers need to arrive together at the destination but in no pre-defined sequence. These two are labelled:

Revolving Bubble Algorithm

Sliding Bubble Algorithm.

In the Revolving Bubble Algorithm groups are activated across an entire merge layer and therefore, requires a layer manager that monitors the completion of groups at the layer. Every time the layer manager detects the completion of a group at the layer it activates the next inactive group, increasing the MAX RSN for all the merges in the layer.

In the Sliding Bubble Algorithm each merge operates without needing to know what the other merges are doing. Therefore, layer managers are not required. Both a MIN RSN and MAX RSN are established at each merge. The MAX RSN is equal to the MIN RSN plus the total number of destinations 50 at the sorter minus 1 (53 in the illustrative embodiment). Only when the group with the MIN RSN completes at the merge can the MAX RSN be adjusted and new groups activated for the merge.

A third algorithm is the sliding bubble with strict sequencing algorithm, in which there may be additional sequencing requirements regarding the arrival of articles at the designation. Each merge operates without needing to know what the other merges are doing. The articles in a group or order is split into suborders with a pre-defined arrival sequence of the sub-orders. The sub-orders need to arrive in the pre-defined sequence and to the same destination. Each sub-order gets assigned a different RSN. Sub-orders of the same order may be released with other orders in between the sub-orders. The number of orders in between sub-orders of the same order cannot exceed the total number of destinations 50 at the sorter minus 1 (53 in the illustrative embodiment). Although all merges handle sub-orders as different orders, sorter 48 sorts the sub-orders based on the parent order ensuring that all sub-orders of the same order are consolidated at the same destination. The MIN RSN and MAX RSN are treated at each merge the same as with the sliding bubble algorithm.

Figure 6:
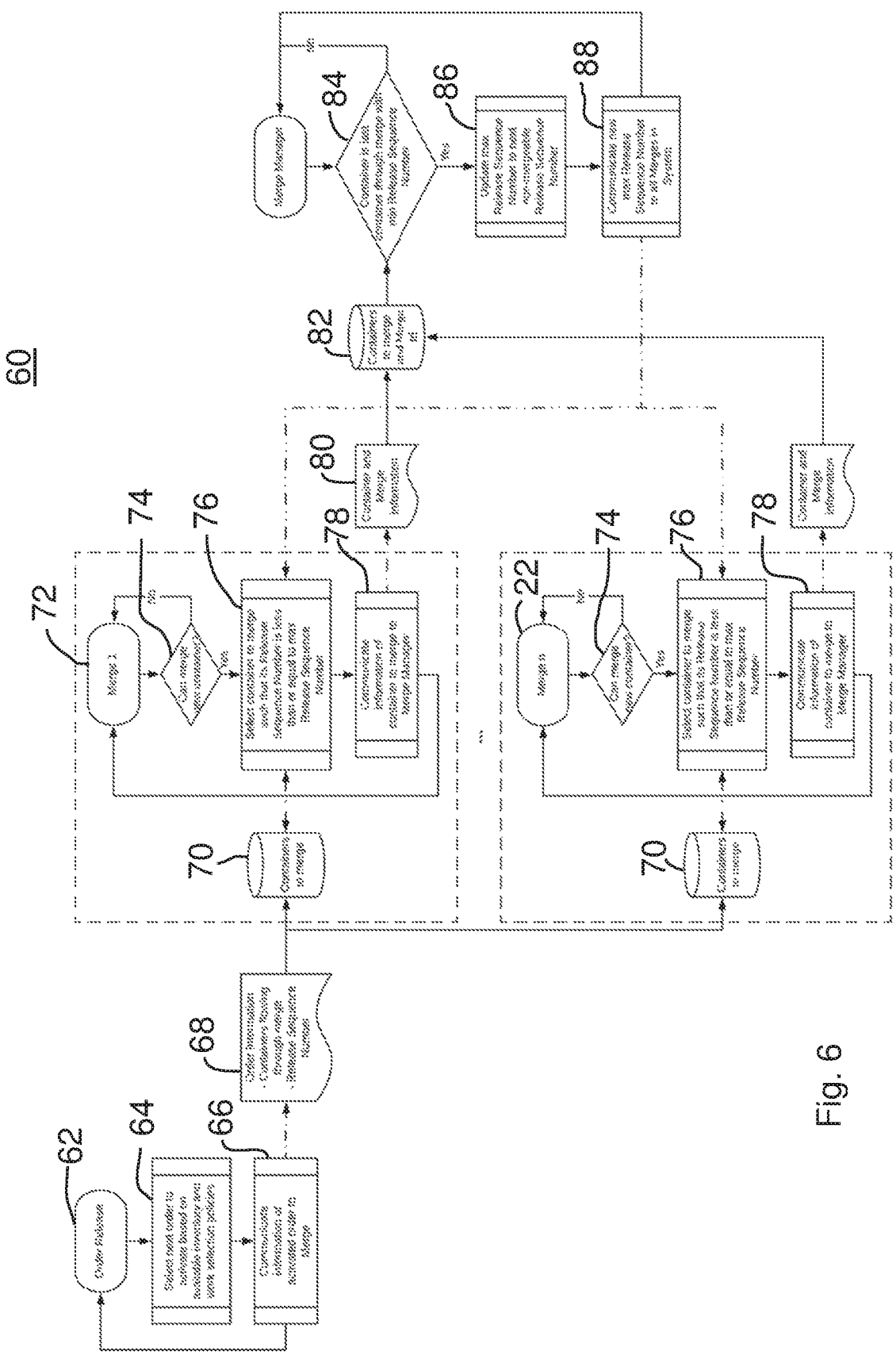
FIG. 6 is a logic flow diagram of a revolving bubble algorithm.

In revolving bubble algorithm 60 an order or group is released from the warehouse management system 14 at 62 based on a priority scheme of the type known in the art at 64 (FIG. 6). Control 12 communicates information at 66 to the queues for all of the merges through which receptacles pertaining to the order will transfer and the sequence those receptacles will be released to the merges at 68. The data will be associated with a particular merge at the manager at 70 for the merges through which the receptacles will be transported based on the source location of the receptacles which contain the order articles. For each merge in the merge level it is determined at 74 whether additional receptacles can be accepted. If so, additional receptacles are sent to that merge with an RSN that is less than or equal to the MAX RSN at 76. The merge manager is updated at 78 and the process is repeated at each merge until data for all receptacles in a group are processed.

The receptacle and merge information is forwarded to the merge manager at 80 and 82 and receptacles are released from the input queues at that merge level. It is determined at 84 whether each receptacle is the last one through the merge that has the MAX RSN. If not then additional receptacles will be added until the last receptacle with the MAX RSN have merged. If so the MAX RSN is updated at 86 to the highest RSN that is not yet active and the new MAX RSN is communicated to the merge manager for that merge level at 88. The increase in the MAX RSN should result in a new order being released from the WMS at 62 which caused revolving bubble algorithm 60 to repeat.

Figure 7:
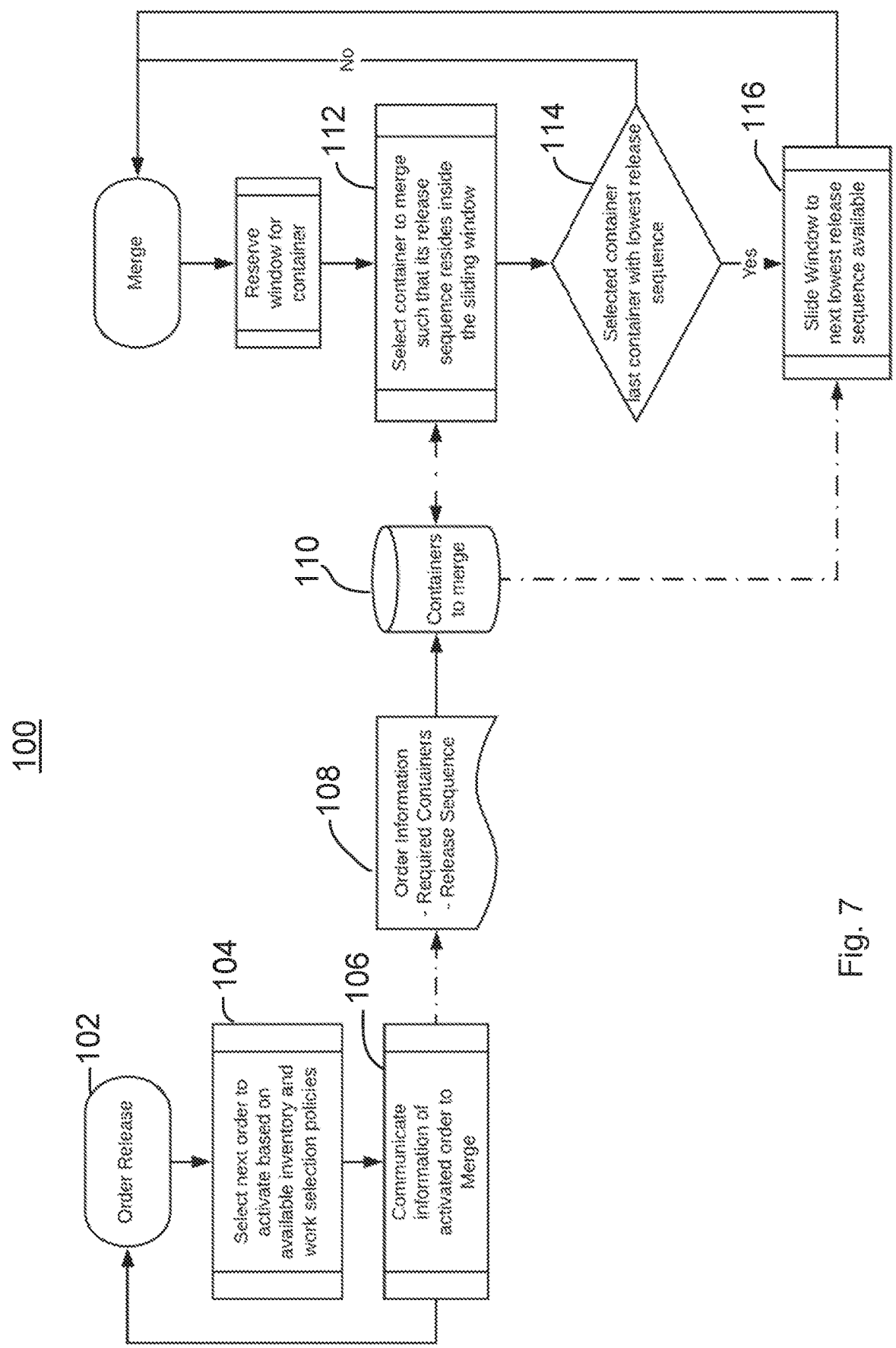
FIG. 7 is a logic flow diagram of a Sliding bubble algorithm.
Figure 8:
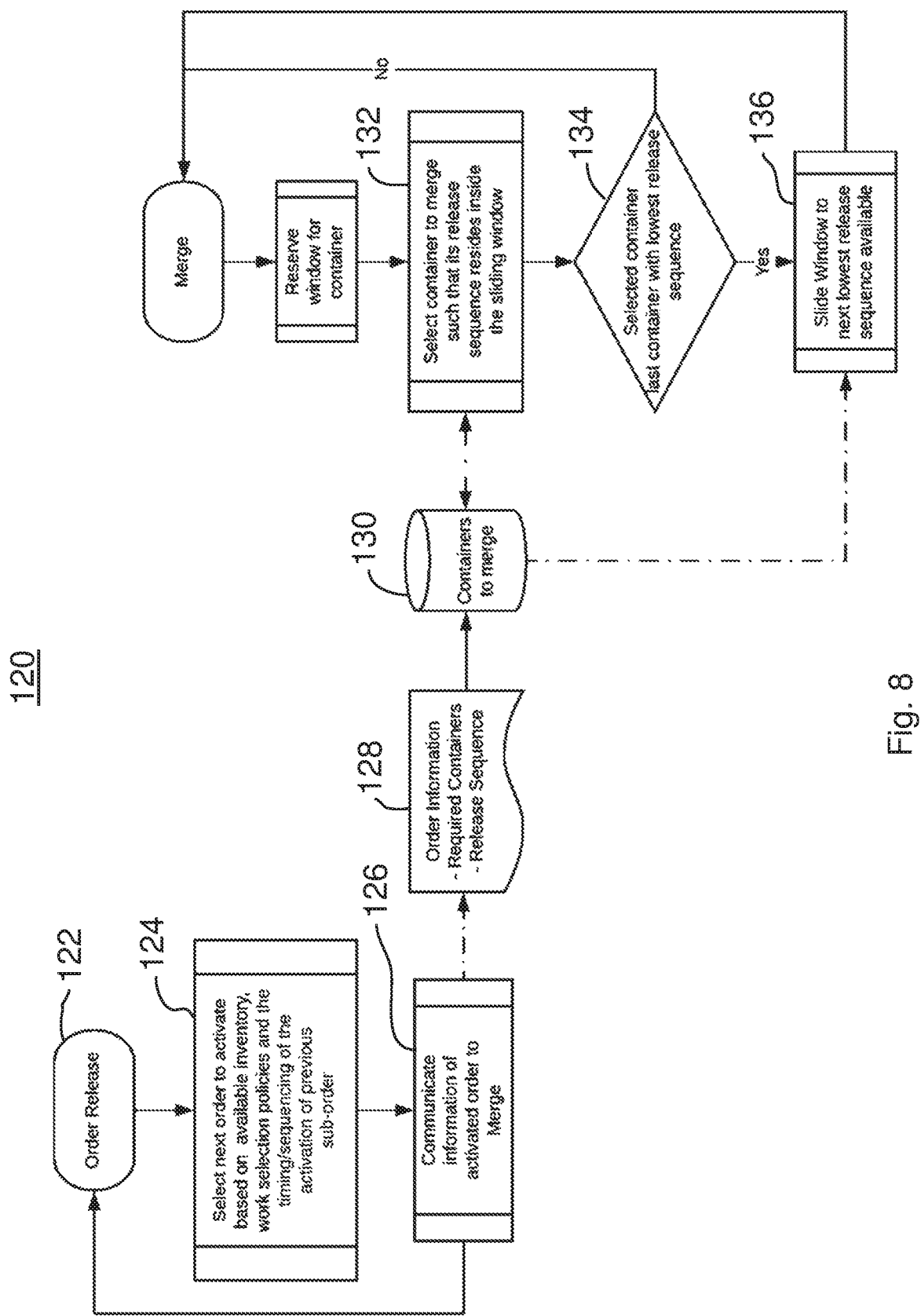
FIG. 8 is a logic flow diagram of a sliding bubble with strict sequencing algorithm.

Sliding bubble algorithm 100 begins at 102 when an order is released from WMS 14 (FIG. 7). The next order is activated by control 12 based on policies and priority at 104 and the information regarding that order is associated with each merge through which the receptacles will travel at 106. There is no merge manager so that information is associated with each merge regarding the receptacles and release sequence of the receptacles. The receptacles are directed toward each merge from an upstream merge or article source aisle at 110. The logic selects which receptacle to merge from the merge input queues at 112 based on the RSN of that receptacle with respect to the MAX RSN. It is then determined at 114 whether the selected receptacle is the last receptacle with MIN RSN. If so, the MIN RSN and MAX RSN are updated at 116. This should result in a new order being released from the WMS at 102 which caused sliding bubble algorithm 100 to repeat.

Algorithm 120 for the sliding bubble with strict sequencing algorithm is essentially the same as sliding bubble algorithm 100 except that the suborders are treated the same as orders for the sliding bubble algorithm and have to be activated 122 according to the same sequence as desired at the destination at 124. The sub-order information is communicated to the merges at 126 including the merges for which the containers will pass and the sequence of the containers at 128 and 130. The containers for the sub-order are released if their RSN is less than or equal to MAX RSN. Containers continue to be released at the merge as long as it is determined at 134 that the receptacle RSN is not the last receptacle with the MIN RSN. Once it is determined at 134 that the selected receptacle is the last receptacle with the MIN RSN, the MIN RSN and MAX RSN are updated at 136, which has the effect of releasing the next suborder at 124. Thus, the receptacles will be delivered to sorter 48 at the desired sequence and sorter 48 consolidates the order at a common sort destination without any intervening receptacles from other orders in the mix.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of consolidating articles from article sources into article groups at destinations in a material handling system, the material handling system having a plurality of article sources, a plurality of article destinations, a plurality of article merges and at least one sorter, each of said merges having a plurality of queue lanes and a discharge, said at least one sorter having: an inbound lane and a plurality of outbound lanes, at least one upstream ones of said queue lanes receiving articles from said article sources, said merges combining articles from said queue lanes and discharging to a downstream merge or said at least one sorter inbound lane, each of said sorter outbound lanes discharging to one of said article destinations, said method comprising:

releasing data from a warehouse management system (WMS), to the material handling system, the data defining groups of articles, activating each group of articles at a merge in a same sequence as the group data is released to the material handling system, and adjusting for any priority of the group; and activating at least one new group of articles as an active group of articles at a merge when all the articles of a group that is already active at that merge has cleared that merge.

2. The method as claimed in claim 1 including releasing any articles that belong to an activated group from a queue lane at a merge without releasing any articles that do not belong to an activated group at that merge.

3. The method as claimed at claim 1 including arranging said article merges in merge layers, each layer defined by merges being a same number of merges from the sorter including a layer manager for each layer of merges, the layer manager providing coordination among merges in a layer so that a new group of articles is activated concurrently for all merges in a layer.

4. The method as claimed in claim 3 including activating a new group of articles as an active group of articles at a particular layer when all items of a group that is already active move past that layer.

5. A method of consolidating articles from article sources into article groups at destinations in a material handling system, the material handling system having a plurality of article sources, a plurality of article destinations, a plurality of article merges and at least one sorter, each of said merges having a plurality of queue lanes and a discharge, said at least one sorter having: an inbound lane and a plurality of outbound lanes, at least one upstream ones of said queue lanes receiving articles from said article sources, said merges combining articles from said queue lanes and discharging to a downstream merge or said at least one sorter inbound lane, each of said sorter outbound lanes discharging to one of said article destination, said method comprising:

releasing data defining groups of articles from a warehouse management system (WMS), to the material handling system, the data identifying: articles making up each group and the location of those articles in the material handling system, an article number for each article in the group and a group release sequencing number (RSN), the RSN assigned to each group is sequential in a same sequence in which that group is released to the material handling system adjusting for any priority of the group;

at each article merge, maintaining a log of a maximum RSN (MAX RSN) for that merge and the RSN for articles in the queue lanes of that merge; and releasing articles from each queue until an article having an RSN greater than the MAX RSN for that merge is next to be released.

6. The method as claimed at claim 5 including arranging said article merges in merge layers, each layer defined by merges being a same number of merges from the sorter.

7. The method as claimed at claim 6 including a layer manager for each merge layer, the layer manager providing coordination among merges in the merge layer so that the MAX RSN is the same for all merges in the merge layer.

8. The method as claimed in claim 6 wherein the layer manager activates a new group at the merge layer when all items of a group that is already active move past the merges of that merge layer.

9. The method as claimed in claim 6 wherein layer manager increases the MAX RSN for a merge layer when all items of group that is already active move past that merges of that merge layer.

10. The method as claimed in claim 7 wherein a number of active groups at each merge layer cannot exceed the number of said article destinations.

11. The method as claimed in claim 5 including activating a subsequent article group at a merge when all articles of a group that is already active have gone through that merge, including activating the article group with the oldest RSN at that merge.

12. The method as claimed in claim 5 including maintaining a maximum RSN (MAX RSN) at a merge so that a number of concurrent activated RSN at that merge does not exceed the number of said destinations.

13. The method as claimed in claim 12 including maintaining a minimum RSN (MIN RSN) for a merge that is the article group with the oldest RSN of any non-completed article group that has articles going through that merge and increasing the MAX RSN for that merge only when the article group having the MIN RSN is completed at that merge.

14. The method as claimed in claim 13 wherein MAX RSN at a merge is equal to MIN RSN plus the number of destinations minus 1 (MIN RSN+destinations−1) at that merge.

15. A method of consolidating articles from article sources into article groups at destinations in a material handling system, the material handling system having: a plurality of article sources, a plurality of article destinations, a plurality of article merges, and a sorter, said method comprising:
connecting said article merges and said sorter in a manner that a discharge of an upstream one of said merges defines said plurality of article sources, outbound lanes of said sorter defines said plurality of article destinations and each intermediate merge discharges to a downstream merge or to said sorter;
releasing data defining groups of articles from a warehouse management system (WMS) to the material handling system, the data identifying: articles making up each group and the location of those articles in the material handling system, an article number for each article in the group and a group release sequencing numbers (RSN), the RSN assigned to each group is sequential in a same sequence in which that group is released to the material handling system adjusted for any priority of that group;
activating an article group at a merge when all articles of an article group that is already active have gone through that merge, including activating an upstream article group with an oldest RSN (MAX RSN) adjusted for a group priority at that merge; and
maintaining a minimum RSN (MIN RSN) at each merge that is the group with the oldest RSN of any non-completed article group that have articles going through the merge and increasing the MAX RSN for that merge only when the article group having the MIN RSN is competed at that merge.

16. The method as claimed in claim 15 wherein a number of concurrent activated article groups at a merge does not exceed the number of article destinations.

17. The method as claimed in claim 16 wherein MAX RSN is equal to MIN RSN plus the number of destinations minus 1 (MIN RSN+destinations−1) at that merge.

18. The method as claimed in claim 15 wherein articles for each group arrive at a destination with defined sequencing of the articles at the destination.

19. The method as claimed in claim 18 including splitting a group into subgroups of articles so that articles arrive at the destination in the pre-defined sequence.

20. The method as claim in claim 19 including assigning a different RSN to each subgroup of a group.

21. The method as claimed in claim 19 including merging all subgroups as a group at a common merge.

22. A material handling system that is adapted to consolidate articles from a plurality of article sources into article groups at a plurality of destinations, said system comprising:
a plurality of article merges and at least one sorter, each of said merges having a plurality of queue lanes and a discharge, said at least one sorter having an inbound lane and a plurality of outbound lanes, said merges combining articles from a plurality of queue lanes and discharging to a downstream merge or said at least one sorter inbound lane, said queue lanes of an upstream merge receiving articles from said article sources said sorter outbound lanes discharging to said article destination;
a control system adapted to receive data from a warehouse management system (WMS), said WMS releasing data defining groups of articles to said control system;
said control system is adapted to activate each group at a merge in a same sequence as the group is released to the material handling system, said control system adjusting for any priority assigned to a group; and
said control adapted to activate a new group at a merge only when all the articles of a group that is already activated at that merge has cleared that merge.

23. A material handling system that is adapted to consolidate articles into article groups, said system comprising:
a plurality of article sources and a plurality of article destinations;
a plurality of article merges and at least one sorter, each of said merges having a plurality of queue lanes and a discharge, said at least one sorter having an inbound lane and a plurality of outbound lanes, said merges combining articles from a plurality of queue lanes and discharging to a downstream merge or said at least one sorter inbound lane, said queue lanes of an upstream merge receiving articles from said article sources said sorter outbound lanes discharging to said article destination;
a control system adapted to receive data from a warehouse management system (WMS), said WMS releasing data defining groups of articles to said control system including: a group ID, a group priority, an article ID for each article in the group and an article source location of each article in the group;

said control system assigning a group release sequencing numbers (RSN) for each group, the RSN assigned to each group is sequential in a same sequence in which that group is released from the WMS to the material handling system adjusted for any group priority;

said control system maintaining for each merge a log of a maximum (MAX RSN) for that merge and the RSN for articles in the queues of that merge; and said control system causing a merge to release articles from each queue until an article having an RSN greater than the MAX RSN for that merge is next to be released.

* * * * *